(12) United States Patent
Park et al.

(10) Patent No.: US 9,232,816 B2
(45) Date of Patent: Jan. 12, 2016

(54) METHOD FOR PREPARING FIBROUS STARCH WITH ENHANCED EMULSIFYING CAPACITY AND LOW-FAT MAYONNAISE AND MARGARINE COMPOSITIONS USING THE SAME

(75) Inventors: Jin Hee Park, Gyeonggi-do (KR); Ah Jin Kim, Seoul (KR); Sung Bae Byun, Seoul (KR); Sang Hoon Song, Gyeonggi-do (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 263 days.

(21) Appl. No.: 13/388,954

(22) PCT Filed: Jun. 11, 2010

(86) PCT No.: PCT/KR2010/003771
§ 371 (c)(1),
(2), (4) Date: Feb. 3, 2012

(87) PCT Pub. No.: WO2011/021770
PCT Pub. Date: Feb. 24, 2011

(65) Prior Publication Data
US 2012/0132197 A1    May 31, 2012

(30) Foreign Application Priority Data
Aug. 17, 2009  (KR) .......................... 10-2009-0075498

(51) Int. Cl.
*C08B 30/00*     (2006.01)
*A23L 1/308*     (2006.01)
*A23D 7/005*     (2006.01)

(52) U.S. Cl.
CPC ............... *A23L 1/308* (2013.01); *A23D 7/0056* (2013.01)

(58) Field of Classification Search
None
See application file for complete search history.

(56) References Cited

U.S. PATENT DOCUMENTS 2,575,352 A  * 11/1951  Lohmar, Jr. .................... 536/103
5,855,946 A  *  1/1999  Seib et al. ....................... 426/549
7,531,199 B2 *  5/2009  Haynes et al. ................. 426/549

FOREIGN PATENT DOCUMENTS

JP       1988-057018         11/1988
JP    2000316520 A   *   11/2000
(Continued)

OTHER PUBLICATIONS

H.S. Guraya and R.T. Toledo et al, Determining Gelatinized Starch in a Dry Starchy Products, Journal of Food Science—vol. 58, No. 4, 1993.*

(Continued)

*Primary Examiner* — Melvin C Mayes
*Assistant Examiner* — Stefanie Cohen
(74) *Attorney, Agent, or Firm* — Swanson & Bratschun, L.L.C.

(57) ABSTRACT

The present invention relates to a fibrous starch with enhanced emulsifying capacity and emulsifying stability, and low-fat mayonnaise and margarine compositions using the same. More specifically, disclosed are fibrous starch which has an increased starch particle size and exhibits improved emulsifying capacity and emulsion stability, prepared by heat-treating starch at a temperature lower than a gelatinization temperature, phosphorylating the starch and further heat-treating the starch sample at a high temperature, and low-fat mayonnaise and margarine compositions in which the content of cooking oil is reduced by 50% or more by adding the fibrous starch with enhanced emulsifying capacity thereto.

7 Claims, 4 Drawing Sheets

(56) References Cited

FOREIGN PATENT DOCUMENTS

| | | | |
|---|---|---|---|
| JP | 2004-204197 | A | 7/2004 |
| JP | 2005-519170 | A | 6/2005 |
| JP | 2007-254739 | A | 10/2007 |
| JP | 2008093657 | A * | 4/2008 |
| JP | 2008-530349 | A | 8/2008 |
| KR | 10-0415308 | | 1/2004 |
| KR | 10-0527412 | B1 | 7/2004 |
| WO | WO 03/098877 | | 11/2003 |

OTHER PUBLICATIONS

International Search Report issued Jan. 14, 2011 in PCT/KR2010/00377.

International Preliminary Report on Patentability issued Feb. 21, 2012 in PCT/KR2010/00377.

* cited by examiner

METHOD FOR PREPARING FIBROUS STARCH WITH ENHANCED EMULSIFYING CAPACITY AND LOW-FAT MAYONNAISE AND MARGARINE COMPOSITIONS USING THE SAME

CROSS-REFERENCE(S) TO RELATED APPLICATIONS

The present invention is a national phase entry under 35 U.S.C. 371 of international application No. PCT/KR2010/003771, filed on Jun. 11, 2010, which claims the benefit of Korean patent application no. 10-2009-0075498, filed on Aug. 17, 2009. The disclosures of said applications are incorporated by reference herein.

TECHNICAL FIELD

The present invention relates to a fibrous starch with enhanced emulsifying capacity and emulsifying stability, and low-fat mayonnaise and margarine compositions using the same.

BACKGROUND ART

Changes in diet in accordance with the recent development of industrial society have brought about an increase in morbidity rates of a variety of adult diseases. In particular, awareness of correlations between fat intake and cardiovascular diseases has considerably increased, and, in particular, an increasing interest in fat intake requires low-calorie, low-fat foods. The reason for high interest associated with fat to reduce calories is that control of calories through fat intake is the most effective method to reduce calories, since the metabolic energy of fat is 9 kcal/g, while the metabolic energy of carbohydrates and proteins is only 4 kcal/g. Accordingly, there is a need for fat substitutes to alternate a part or all of fat present in margarine having a fat content of 80% or more, and dressings, mayonnaises, cheeses, cakes and baked goods having a fat content of 25 to 40%.

Fat substitutes may be classified into protein-based fat substitutes, carbohydrate-based fat substitutes, fat-based fat substitutes and synthetic fat substitutes depending on the composition thereof. Among these, as carbohydrate-based fat substitutes, modified starches prepared by chemical treatment methods have been utilized in a variety of applications including solid foods such as baked goods, breads and noodles, composed of starch components.

These modified starches are obtained by modifying starches through physical and chemical treatment so that the starches have novel functions and thus overcome limitations of general starches, in order to more efficiently use starches and expand utilization range thereof. However, these modified starches are disadvantageously readily separated due to low emulsifying capacity, when applied to liquid foods such as mayonnaise.

DISCLOSURE

Technical Problem

Therefore, the present invention has been made in view of the above problems, and it is one object of the present invention to provide a method for preparing fibrous starch with enhanced emulsifying capacity, comprising heat-treating starch at a temperature lower than a gelatinization temperature, phosphorylating the starch and heat-treating the starch at a high temperature, in an attempt to suggest development potential of high value-added foods in which calories of fat-containing foods are reduced and dietary fibers are supplemented.

In addition, it is another object of the present invention to provide low-fat mayonnaise and margarine compositions which contain a great amount of dietary fiber and exhibit improved emulsification stability, prepared from the fibrous starch with enhanced emulsifying capacity.

The above and other objects of the present invention can be accomplished by the present invention described below.

Technical Solution

In accordance with an aspect of the present invention, the above and other objects can be accomplished by the provision of a method for preparing fibrous starch with enhanced emulsifying capacity, including: (a) heat-treating resistant starch at a temperature lower than a gelatinization temperature; (b) adding sodium sulfate ($Na_2SO_4$) and a cross-linking agent to the starch; (c) adding a base to the starch to adjust the pH thereof to 10-12, followed by cross-linking by phosphorylation; (d) adding an acid to the cross-linked product to perform neutralization; (e) heat-treating the starch sample obtained from the process (d) at a temperature higher than the gelatinization temperature for a short time; and (f) washing the starch sample, followed by drying.

In accordance with another aspect of the present invention, provided is a low-fat mayonnaise/margarine composition using the fibrous starch, which contains a great amount of dietary fiber and exhibits improved emulsion stability.

Advantageous Effects

The present invention can provide a fibrous starch suitable for use in semi-solid emulsion food because the fibrous starch has a shape and emulsifying capacity similar to oil-in-water emulsion particles by increasing the size of starch particles through physical treatment. In addition, the present invention provides a low-calorie, low-fat dietary foods such as low-fat mayonnaise and margarine with improved emulsion stability because starch particles have stable emulsifying capacity and thus it can realize strong physical properties of emulsions and give soft textures by substituting for fats in liquid foods.

DESCRIPTION OF DRAWINGS

The above and other objects, features and other advantages of the present invention will be more clearly understood from the following detailed description taken in conjunction with the accompanying drawings, in which.

Particle size distribution of raw corn starch and fibrous starch measured using a particle size analyzer (a: raw corn starch, b: corn fibrous starch, c: high-temperature heat-treated corn fibrous starch)

Figure 2:
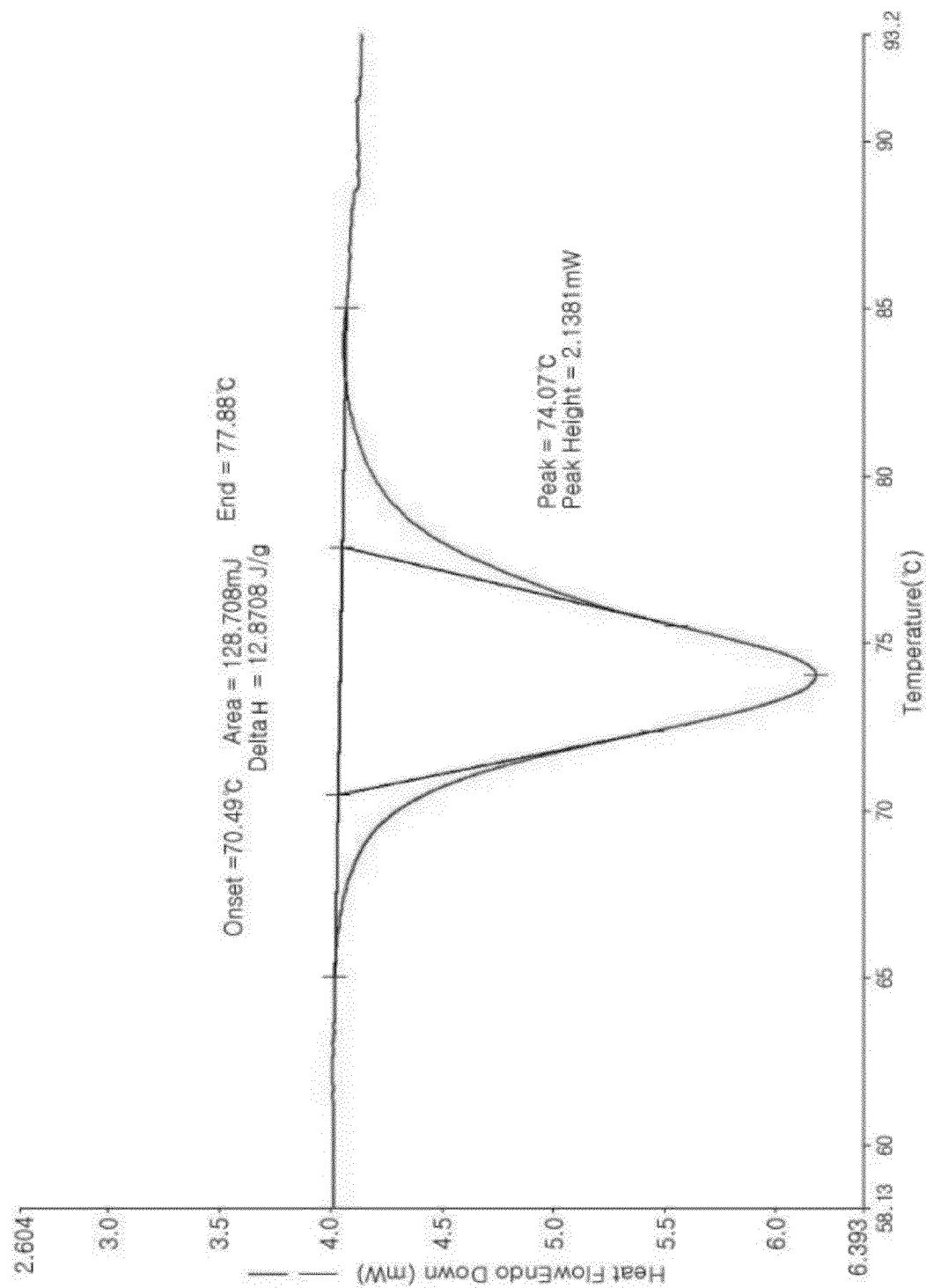
Figure 3:
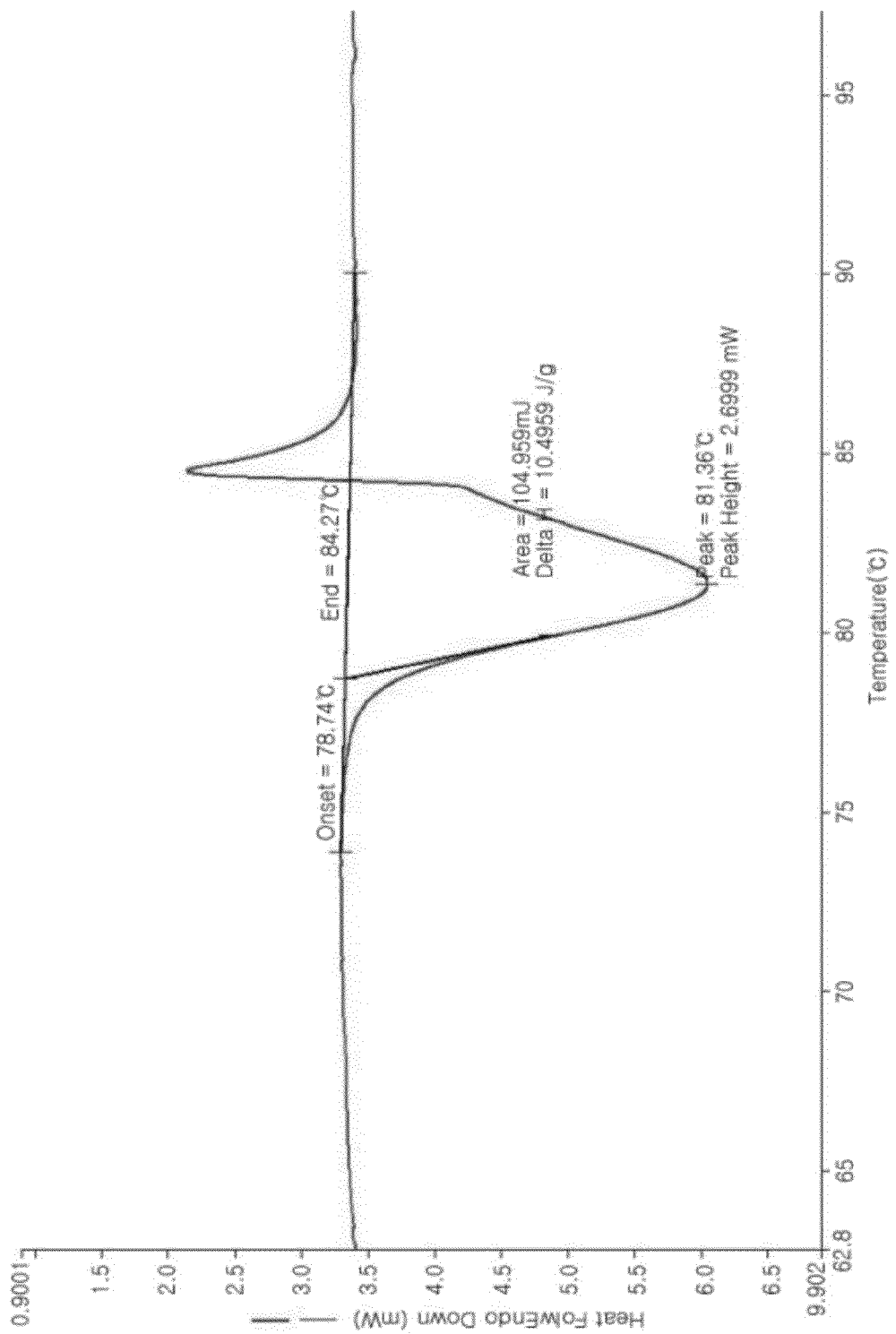
Figure 4:
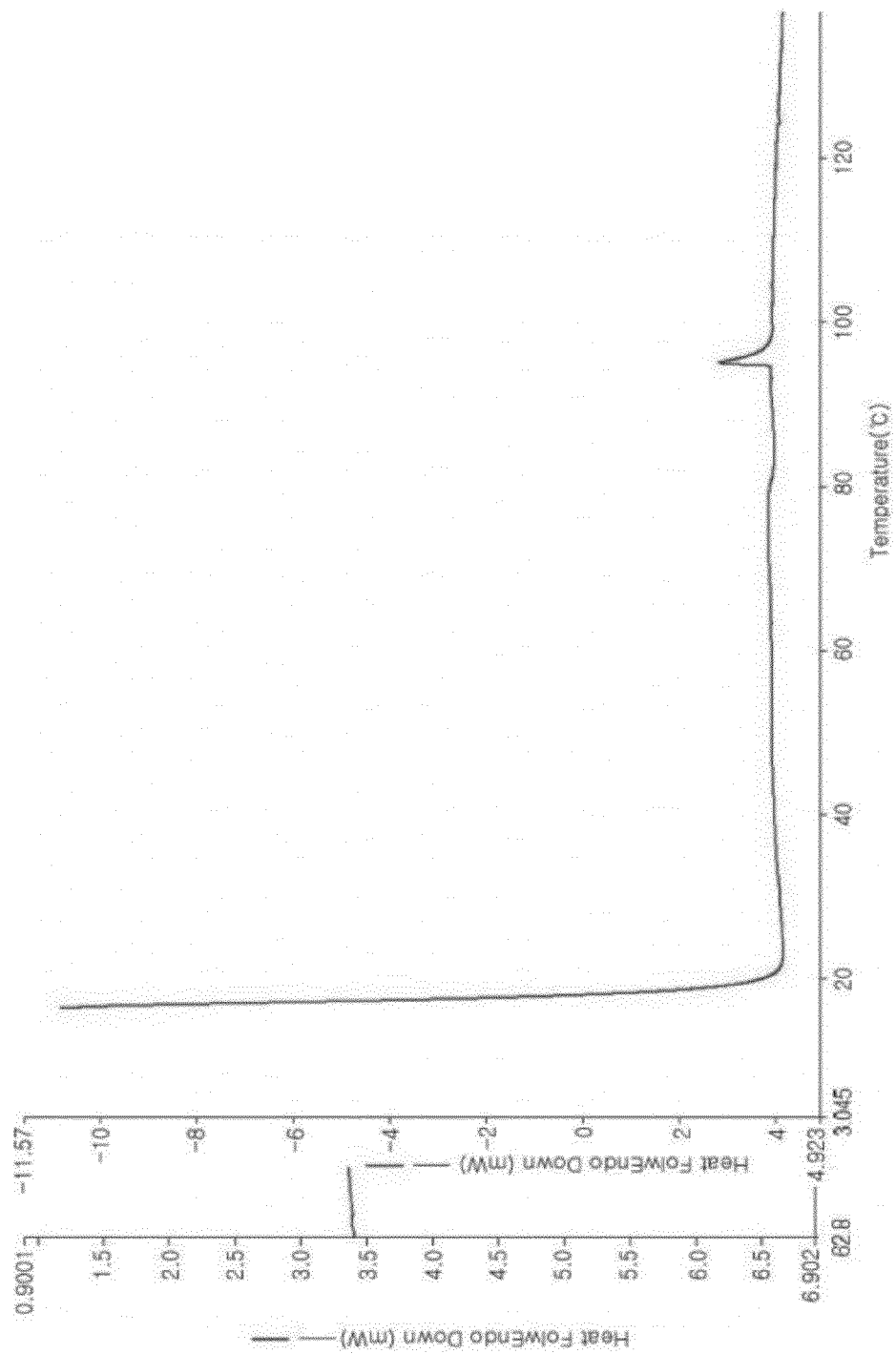

FIGS. 2 to 4 are graphs showing gelatinization peaks of raw corn starch, corn fibrous starch, and high-temperature heat-treated corn fibrous starch (FIG. 2: raw corn starch, FIG. 3: corn fibrous starch, and FIG. 4: high-temperature heat-treated corn fibrous starch).

BEST MODE

Hereinafter, the present invention will be described in detail.

The method for preparing the fibrous starch according to the present invention comprises: (a) heat-treating starch at a temperature lower than a gelatinization temperature; (b) adding sodium sulfate ($Na_2SO_4$) and a cross-linking agent to the starch; (c) adding a base to the starch to adjust the pH thereof to 10-12, followed by cross-linking by phosphorylation; (d) adding an acid to the cross-linked product to perform neutralization; (e) heat-treating the starch sample at a temperature higher than the gelatinization temperature for a short time; and (f) washing the starch sample, followed by drying.

As used herein, the term "fibrous starch" refers to a starch prepared in accordance with the processes (a) to (d), which has total dietary fiber (TDF) of 50% or more and thus exhibits high dietary fiber activity.

As used herein, the term "fibrous starch with enhanced emulsifying capacity" refers to a starch which contains an increased amount of dietary fiber and has an increased particle size, obtained by heat-treatment the fibrous starch at a high temperature.

The starch used in the present invention may be a grain powder. The starch is preferably rice starch or corn starch, and is more preferably corn starch. The same treatment may be applied to other starches including Tapioca starch to obtain the same effects.

Water is added to the starch such that the concentration of starch used in the process (a) is adjusted to 25 to 60% by weight, and is preferably 40% by weight. The concentration of starch may be varied depending on the type of starch and a high concentration of starch solution may contain a great amount of dietary fiber as long as there is no difficulty in stirring.

In the process (a), the starch is heat-treated at a temperature lower than a gelatinization temperature to accomplish stable phosphorylation of starch particles. Generally, the gelatinization temperature of starch is 55° C. to 65° C. In the present invention, the heat-treatment is preferably carried out by shaking at 40° C. to 55° C. for 0.5 to 3 hours, more preferably by shaking at 50° C. for 1 hour.

In the process (b), a cross-linking agent is added to the starch heat-treated in the process (a). As the cross-linking agent, sodium trimetaphosphate (STMP, 99.0-99.9%) and sodium tripolyphosphate (STPP, 0.1-1.0%) are added in an amount of 8 to 12% by weight, based on the weight of the starch. At this time, to inhibit gelatinization of starch, to 12% by weight (preferably 10% by weight) of sodium sulfate ($Na_2SO_4$) is added, based on the dry weight of starch, before the cross-linking agent is added to the starch solution.

In the process (c), the starch is cross-linked through phosphorylation by addition of the cross-linking agent. A base is added to adjust pH to 10-12, preferably pH 11.5. At this time, the base may be a general base and is preferably NaOH. After titration of pH, the reaction is performed at 40° C. to 55° C., which is the same as the heat-treatment temperature in the process (a), for 1 to 6 hours, preferably, at 50° C. for 3 hours.

In the process (d), after the reaction, an acid is added to the starch to neutralize the reaction solution. At this time, the acid may be selected from general acids and is preferably HCl.

In the process (e), the starch sample obtained from process (d) is heat-treated by shaking at a temperature of 80° C. to 95° C. which is higher than a gelatinization temperature, for 1 minute to 30 minutes. Preferably, heat-treatment is performed at 85° C. for 20 minutes. After phosphorylation, heat-treatment at a high temperature for a short period of time transforms a part of starch particles into amorphous forms and imparts a stable structure enabling performance of the function of an emulsion thereto.

In the process (f), the starch sample is repeatedly washed with water such that the content of phosphorous remaining in the starch sample of the process (e) is adjusted to below 0.32-0.4%. The washed starch solution is dried such that the moisture content is adjusted to 5% or less, ground and screened to a size of 100 μm to obtain fibrous starch which contains an increased amount of dietary fibers and exhibits stable emulsifying capacity.

The particle size of fibrous starch obtained by the preparation method according to the present invention is preferably 100 to 300 μm.

The present invention provides low-fat mayonnaise and margarine compositions which contain an increased amount of dietary fibers and exhibit improved emulsion stability using the fibrous starch obtained by the method of the present invention.

In an attempt to develop low-calorie fat emulsion foods which have high dietary fiber content and enhanced emulsion stability, using fibrous starch instead of fats to impart emulsifying capacity to mayonnaise and margarine, the present invention uses fibrous starch with a controlled particle size by the method described above.

Mayonnaise and margarine are prepared by a common method. The fibrous starch is added in an amount of 5 to 50% by weight. In a preferred embodiment, 50% by weight of fibrous starch is used for preparing mayonnaise and 20% by weight of fibrous starch is used for preparing margarine.

The stability of emulsion foods increases, as layer separation rate of the mixing solution decreases. As material exhibits good storage stability, it is considered to be suitable for preparing mayonnaise. Since starch is readily separated when applied to liquid emulsion foods, conventional fibrous starches have only been applied to solid foods such as bakeries, breads and noodles. However, fibrous starches can be applied to solid and liquid foods by phosphorylating starch and heat-treating the starch at a high temperature before and after phosphorylation in accordance with the present invention, thereby imparting emulsifying capacity to the starch.

Now, the present invention will be described in more detail with reference to the following Examples. These examples are only provided to illustrate the present invention and should not be construed as limiting the scope and spirit of the present invention.

EXAMPLES

Example 1

Heat-Treatment to Stabilize Starch Particles

Two corn starch (Shindongbang CP Corporation) emulsions having different concentrations of 30% and 40% were heat-treated in baths at 45° C. and 50° C. for 1 hour, respectively.

The 30% starch emulsion was prepared by adding 900 g of starch (on a dry weight basis) to 3,000 L of water and stirring the mixture at room temperature for 10 minutes.

The stirring was carried out using a stirrer at a rate of 120 rpm to realize homogeneous heat-treatment. The heat-treatment at a temperature lower than a gelatinization temperature for a short time imparts a stable structure to starch particles based on partial gelatinization of starch particles and increases a total dietary fiber.

Example 2

Preparation of Fibrous Starch Through Crosslinking Reaction Based on Phosphorylation 10% of $Na_2SO_4$ and 12% of a mixture of sodium trimetaphosphate and sodium tripolyphosphate were added to 30% and 40% raw corn starch suspensions, and 4% of NaOH was added thereto to adjust the pH thereof to 11.5.

This starch mixture solution was reacted at 45° C. and 50° C. for 3 hours, and then the pH thereof was adjusted to 6.5 using 3.65% HCl. Then, the mixture solution was washed with distilled water three times, centrifuged, dried and ground at 40° C., and passed through a 100-mesh sieve to prepare fibrous starch at different concentrations.

Example 3

Measurement of Total Dietary Fiber Content of Fibrous Starch Using AOAC Method The total dietary fiber content of corn fibrous starch prepared in Example 2 was investigated. A test analysis method used herein was an Association of Official Chemists (AOAC) method.

40 mL of a phosphate buffer solution (pH 6.0) was added to 1.0 g of a sample, followed by thoroughly dispersing the same. 0.1 mL of amylase (heat stable α-amylase, Cat No. A-3306, Sigma) was added to a boiling bath (100° C.), reacted for 15 minutes while stirring, and immediately cooled to room temperature. 0.275N NaOH was added to the reaction solution to adjust the pH to 7.5, and 0.1 mL of protease (Cat No. P-3910, Sigma, 50 mg/mL of a phosphate buffer) were added thereto, followed by reacting in a constant-temperature shaker at 60° C. for 30 minutes.

Then, 0.325M HCl was added to adjust the pH to 4.0-4.6, and 0.1 mL of amyloglucosidase (Cat No. A-9913, Sigma) was added thereto, followed by reaction at 60° C. for 30 minutes. Ethanol was added to the reaction solution such that a total alcohol concentration wad adjusted to 80% to stop the reaction, allowed to stand for more than one hour, and then filtered in a crucible (2G3, IWAKI) containing preliminarily dried and weighed celite. A sample contained in the crucible was washed in order of 95%, 78% ethanol and acetone, an insoluble residue was dried in an oven at 105±0.1° C. for 16 hours and weighed, and total dietary fiber content was calculated based on the difference in weight of crucible before and after filtration.

As a result of tests, as can be seen from Table 1 below, in a case where the concentration of starch is 30%, the total dietary fiber content was 44.8% at a heat-treatment/phosphorylation temperature of 45° C., and was 73.2% at a heat-treatment/phosphorylation temperature of 50° C. On the other hand, in a case where the concentration of starch is 40%, the total dietary fiber content was 45% at a heat-treatment/phosphorylation temperature of 45° C., and the total dietary fiber content was 95.1% at a heat-treatment/phosphorylation temperature of 50° C.

As the concentration of starch increases, the distance between branch chains decreases, crosslinking reaction by phosphorylation is efficient, and total dietary fiber content increases. In addition, as the heat-treatment/phosphorylation temperature at a same concentration increases, starch particles are partially swollen, a cross-linking agent is homogeneously dispersed, crosslinking reaction is efficiently performed and total dietary fiber content also increases.

TABLE 1

Total dietary fiber content of fibrous starch prepared by heat-treatment and phosphorylation

| Starch concentration (%) | Heat-treatment temperature (° C.) | Phosphorylation temperature (° C.) | Total dietary fiber content (%) |
|---|---|---|---|
| 30 | 45 | 45 | 44.8 |
|    | 50 | 50 | 73.2 |
| 40 | 45 | 45 | 79.1 |
|    | 50 | 50 | 95.1 |

Example 4

Heat-Treatment to Enhance Emulsifying Capacity of Fibrous Starch

The emulsion of corn fibrous starch was prepared at a concentration of 30% and heat-treated at a high temperature of 85° C. for 20 minutes. The heat-treatment was carried out in the water bath to prevent heat from being directly applied to the starch solution. Heat-treatment at a high temperature for a short time enables the starch particles to be flexibly swollen, imparts a stable structure to the emulsion and provides the characteristics of w/o emulsions. Table 2 shows an average particle size of starch measured. The fibrous starch heat-treated at a high temperature had an average particle size of 163.2 μm, which is 10 times or higher than the average particle size of fibrous starch.

TABLE 2

Average particle size of high-temperature heat-treated corn fibrous starch

|  | $d_{10}$ (μm) | $d_{50}$ (μm) | $d_{90}$ (μm) | Mean (μm) |
|---|---|---|---|---|
| Raw corn starch | 8.256 | 22.41 | 50.94 | 15.72 |
| Corn fibrous starch | 3.582 | 14.58 | 25.79 | 16.27 |
| High-temperature heat-treated corn fibrous starch | — | 148.5 | 334.6 | 163.2 |

$d_{10}$ (μm): Average particle size of starch particles within the bottom 10% in distribution of starch particles
$d_{50}$ (μm): Average particle size of starch particles within the bottom 50% in distribution of starch particles
$d_{90}$ (μm): Average particle size of starch particles within the bottom 90% in distribution of starch particles

Example 5

Figure 1:
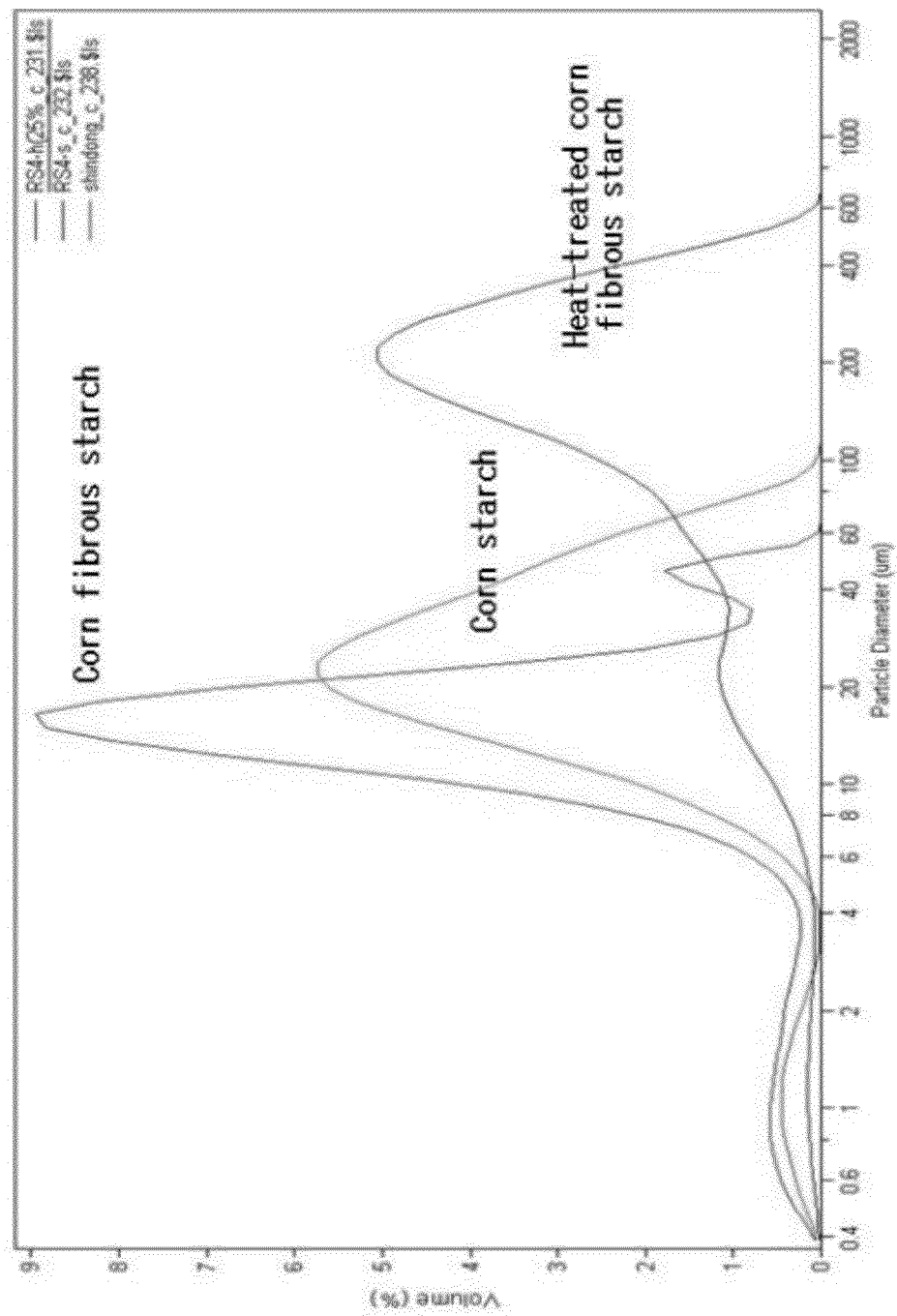
FIG. 1 shows a particle distribution curve of high-temperature heat-treated corn fibrous starch.

Analysis of Particle Size of High-Temperature Heat-Treated Corn Fibrous Starch A particle size analyzer (Laser Diffraction Particle Size Analyzer LS 13-320, BECKMAN COULTER, USA) was used to investigate the particle size distribution of raw corn starch, corn fibrous starch and high-temperature heat-treated corn fibrous starch. Samples were dispersed in methanol and measured. The particle size distribution of raw corn starch, corn fibrous starch, and high-temperature heat-treated corn fibrous starch are shown in FIG. 1. The particle size of raw corn starch was mostly distributed within a range of 10 to 20

µm, but corn fibrous starch prepared by heat-treatment prior to phosphorylation and cross-linking reaction through phosphorylation exhibited a particle size distribution of 20 to 40 µm which is larger than that of raw corn starch. On the other hand, the high-temperature heat-treatment fibrous starch mostly exhibited a particle size distribution of 200 to 300 µm which is considerably larger than that of fibrous starch.

Example 6

Evaluation of Gelatinization Properties and Physical Properties of High-Temperature Heat-Treated Corn Fibrous Starch The gelatinization properties of raw corn starch, corn fibrous starch, and high-temperature heat-treated corn fibrous starch were investigated using a differential scanning calorimetry (DSC, SII, SSC/5200H, Seiko Co., Japan). 10 mg of each sample was mixed with 30 mg of water, the water balance of mixture was allowed to equilibrate for 2 hours, and gelatinization properties of each starch were evaluated while the temperature was elevated at a rate of 5° C./min from 25° C. to 130° C.

Table 3 shows onset temperature, peak temperature, conclusion temperature and calories of gelatinization of each starch. The gelatinization onset temperatures of raw corn starch, corn fibrous starch and high-temperature heat-treated corn fibrous starch were 70.49° C., 78.74° C. and 80.65° C., respectively. The gelatinization temperature of fibrous starch was higher than that of raw starch. The gelatinization peak temperature and conclusion temperature of fibrous starch also exhibited the same behaviors as gelatinization onset temperature. However, in terms of enthalpy of gelatinization calories, raw corn starch was 12.87 J/g, corn fibrous starch was 10.49 J/g, and high-temperature heat-treated corn fibrous starch was 0.95 J/g. Most of high-temperature heat-treated corn fibrous starch did not undergo further gelatinization. High temperature heat-treatment for a short time enables starch particles of fibrous starch to be swollen and maintains crystallinity thereof.

TABLE 3

Gelatinization properties of high-temperature heat-treated corn fibrous starch

| Sample | Melting temperature (° C.) | | | |
|---|---|---|---|---|
| | Gelatinization onset temperature ($T_o$) | Gelatinization peak temperature ($T_p$) | Gelatinization conclusion temperature ($T_c$) | H (J/g) |
| Raw corn starch | 70.49 | 74.07 | 77.88 | 12.87 |
| Corn fibrous starch | 78.74 | 81.36 | 84.27 | 10.49 |
| High-temperature heat-treated corn fibrous starch | 80.65 | 83.37 | 88.67 | 0.95 |

FIGS. 2 and 4 show gelatinization peak point of raw corn starch, corn fibrous starch, and high-temperature heat-treated corn fibrous starch. The high-temperature heat-treated corn fibrous starch did not almost exhibit gelatinization peak point.

Example 7

Physical Properties of High-Temperature Heat-Treated Fibrous Starch

The water binding capacity (WBC) and oil binding capacity (OBC) of raw corn starch and corn fibrous starch and high-temperature heat-treated corn fibrous starch was measured.

1.0 g of each sample was placed in a 50 mL centrifuge tube, 30.0 mL of water or soybean oil was added thereto, the resulting mixture was dispersed at room temperature for 1 hour and centrifuged at a rate of 3,000 rpm for 20 minutes, the precipitate was weighed, and WBC and OBC were calculated in accordance with the following equation:

Water/oil binding capacity (%)={Weight of precipitate after centrifugation (g)−sample weight (g)}×100/weight of sample (g)

Water binding capacities of raw corn starch, corn fibrous starch and high-temperature heat-treated corn fibrous starch were 1.26, 2.10 and 2.57 g/g, respectively. The high-temperature heat-treated corn fibrous starch exhibited the highest water binding capacity. The oil binding capacity of raw corn starch was 1 g/g higher than those of corn fibrous starch and high-temperature heat-treated corn fibrous starch. This indicates that raw corn starch has a higher oil binding capacity than fibrous starch.

TABLE 4

Physical properties of high-temperature heat-treated corn fibrous starch

| Properties | Raw corn starch | Raw corn starch | High-temperature heat-treated corn fibrous starch |
|---|---|---|---|
| WBC (g/g) | 1.26 | 2.10 | 2.57 |
| OBC (g/g) | 5.00 | 4.01 | 4.14 |

Example 8

Preparation of Mayonnaise Containing High-Temperature Heat-Treated Corn Fibrous Starch and Measurement of Viscosity Thereof Mayonnaise containing raw corn starch, mayonnaise containing corn fibrous starch, and mayonnaise containing high-temperature heat-treated corn fibrous starch were prepared under conditions set forth in Table 5, and the viscosity thereof was measured using a rheometer (Compac-100, Sun Sci. Co., Japan). The corn fibrous starch was contained in an amount of 16% by weight, and the high-temperature heat-treated corn fibrous starch was contained in an amount of 17.5% by weight.

TABLE 5

Composition of mayonnaise containing high-temperature heat-treated corn fibrous starch

| Constituent components | Control mayonnaise (%) | Mayonnaise containing raw corn starch (%) | Mayonnaise containing corn fibrous starch (%) | Mayonnaise containing high-temperature heat-treated corn fibrous starch (%) |
|---|---|---|---|---|
| Soybean oil | 78 | 45 | 45 | 39 |
| Egg yolk | 7 | 7 | 7 | 7 |
| Vinegar | 3 | 4 | 4 | 4 |
| Sugar | 1 | 1 | 1 | 1 |
| Salt | 0.8 | 0.8 | 0.8 | 0.8 |
| water | 10 | 26 | 26 | 30.5 |
| Fat substitute | — | 16 | 16 | 17.5 |
| Total | 99.8 | 99.8 | 99.8 | 99.8 |

Table 6 shows comparison results of viscosity of mayonnaise containing raw corn starch, mayonnaise containing corn fibrous starch, and mayonnaise containing high-temperature heat-treated corn fibrous starch. The viscosity of each sample was repeatedly measured 6 times and an average viscosity was calculated. The measurement conditions were as follows: press/traction, press; mode, 20; dia of probe, 25 mm; sample size, φ30×15 mm; load cell, 2.0 Kg; table speed, 60.0 mm/min.

The viscosity of commercially available mayonnaise was $1.25 \times 10^5$ cP, while mayonnaise containing raw corn starch and mayonnaise containing corn fibrous starch had a considerably low viscosity and could not realize physical properties. On the other hand, the viscosity of mayonnaise containing high-temperature heat-treated corn fibrous starch was $1.17 \times 10^5$ which was comparable to mayonnaise as a control group.

TABLE 6

Viscosity of mayonnaise containing high-temperature heat-treated corn fibrous starch

| Constituent components | Control mayonnaise (%) | Mayonnaise containing raw corn starch (%) | Mayonnaise containing corn fibrous starch (%) | Mayonnaise containing high-temperature heat-treated corn fibrous starch (%) |
|---|---|---|---|---|
| Viscosity (cP) | $1.25 \times 10^5$ | $0.39 \times 10^5$ | $0.43 \times 10^5$ | $1.17 \times 10^5$ |

Example 9

Evaluation of Emulsion Stability and Fat & Oil Substitution Ratio of Mayonnaise Containing High-Temperature Heat-Treated Corn Fibrous Starch The mayonnaise was placed in a microtube, stored in a 45° C. temperature-constant chamber for 7 days and centrifuged at a rate of 8,000 rpm for 15 minutes. The emulsion stability of the mayonnaise was calculated in accordance with the following equation as a fat & oil separation ratio.

Emulsion stability of mayonnaise (%)={weight of fat & oil contained in mayonnaise (g)−weight of fat & oil after centrifugation (g)}×100/weight of fat & oil contained in mayonnaise (g)

Table 7 shows measurement results of emulsion stability of mayonnaise containing raw corn starch, mayonnaise containing corn fibrous starch and mayonnaise containing high-temperature heat-treated corn fibrous starch. Mayonnaise as a control group exhibited a fat & oil separation ratio of 1.4%, and mayonnaise containing raw corn starch exhibited an increased fat & oil separation ratio of 10.2%. However, mayonnaise containing corn fibrous starch and mayonnaise containing high-temperature heat-treated corn fibrous starch had fat & oil separation ratio of 0.6% and 0.4%, respectively. The mayonnaises containing fibrous starches exhibited higher emulsion stability than that of the mayonnaise as control group.

TABLE 7

Emulsion stability of mayonnaise containing high-temperature heat-treated corn fibrous starch

| Constituent components | Control mayonnaise (%) | Mayonnaise containing raw corn starch (%) | Mayonnaise containing corn fibrous starch (%) | Mayonnaise containing high-temperature heat-treated corn fibrous starch (%) |
|---|---|---|---|---|
| Stability (%) | 98.6 | 89.8 | 99.4 | 99.6 |

Table 8 shows amount of oil which is able to be substituted in mayonnaise containing raw corn starch, mayonnaise containing corn fibrous starch, and mayonnaise containing high-temperature heat-treated corn fibrous starch. In case of mayonnaise containing raw corn starch and mayonnaise containing corn fibrous, soybean oil content was about 40% decreased, as compared to control mayonnaise group. On the other hand, in case of mayonnaise containing high-temperature heat-treated corn fibrous starch, soybean oil content was about 50% decreased and viscosity was similar to the control mayonnaise group.

TABLE 8

Amount of substituted oil in myonnaise containing high-temperature heat-treated corn fibrous starch

| Constituent components | Control mayonnaise (%) | Mayonnaise containing raw corn starch (%) | Mayonnaise containing corn fibrous starch (%) | Mayonnaise containing high-temperature heat-treated corn fibrous starch (%) |
|---|---|---|---|---|
| Amount of substituted oil (%) | — | 40 | 40 | 50 |

Table 9 shows calories of mayonnaise as a control group, mayonnaise containing raw corn starch, mayonnaise containing corn fibrous starch and mayonnaise containing high-temperature heat-treated corn fibrous starch. The calorie of commercially available mayonnaise was 708 kcal per gram, while calorie of mayonnaise containing raw corn starch was 635 kcal, calorie of mayonnaise containing corn fibrous starch was 427 kcal, and calorie of mayonnaise containing high-temperature heat-treated corn fibrous starch was 374.5 kcal.

TABLE 9

Calorie of mayonnaise containing high-temperature heat-treated corn fibrous starch

| Constituent components | Control mayonnaise (%) | Mayonnaise containing raw corn starch (%) | Mayonnaise containing corn fibrous starch (%) | Mayonnaise containing high-temperature heat-treated corn fibrous starch (%) |
|---|---|---|---|---|
| Calorie (%) | 708 | 635 | 427 | 374.5 |

Low-calorie, low-fat mayonnaise having 50% or more lower calorie while maintaining physical properties of conventional mayonnaise could be prepared by applying high-temperature heat-treated corn fibrous starch to mayonnaise.

Example 10

Preparation of Margarine Containing High-Temperature Heat-Treated Corn Fibrous Starch and Calorie Thereof The high-temperature heat-treated corn fibrous starch was added under conditions set forth in Table 10 below to prepare margarine.

The high-temperature heat-treated corn fibrous starch was added in amounts of 10% by weight and 13.5% by weight, to reduce the amount of palm oil used to 25% and 50%, respectively.

Margarine in which the high-temperature heat-treated corn fibrous starch was added and fats & oils were reduced to 25% exhibited physical properties comparable to margarine of the control group. On the other hand, margarine in which high-temperature heat-treated corn fibrous starch was added to replace 50% or more of palm oil exhibited a reverse phase from w/o phase to o/w phase and thus did not exhibit physical properties of margarine. Margarine in which use of palm oil was reduced to 25% exhibited a calorie of 563.5 kcal/100 g which was considerably lower than 737.5 kcal/100 g, the calorie of margarine as a control group. In order to reduce oil calories, while maintaining physical properties of conventional margarine, calories could be reduced to 25% by using high-temperature heat-treated corn fibrous starch.

TABLE 10

Composition of margarine containing high-temperature heat-treated corn fibrous starch

| Constituent components | Margarine of Control group (%) | 25% low-fat margarine (%) | 50% low-fat margarine (%) |
|---|---|---|---|
| Palm oil | 80 | 60 | 40 |
| Glycerin fatty acid ester | 0.2 | 0.2 | 0.2 |
| Lecithin | 0.2 | 0.2 | 0.2 |
| Refined salt | 0.5 | 0.5 | 0.5 |
| Starch as fat substitute | 0 | 10 | 13.5 |
| Mixing water | 18.8 | 28.8 | 45.3 |
| Buffer flavor 1 | 0.2 | 0.2 | 0.2 |
| Buffer flavor 2 | 0.1 | 0.1 | 0.1 |
| Total | 100 | 100 | 100 |

TABLE 11

Calorie of margarine containing high-temperature heat-treated corn fibrous starch

| Constituent components | Margarine of Control group (%) | 25% low-fat margarine (%) | 50% low-fat margarine (%) |
|---|---|---|---|
| Calorie (kcal/100 g) | 737.5 | 563.5 | 383 |

The invention claimed is:

1. A method for preparing fibrous starch with enhanced emulsifying capacity, comprising:
    (a) adding starch to a medium consisting essentially of water to form a starch emulsion having a starch concentration of 25 to 60% by weight
    (b) heat treating the starch at a temperature lower than a gelatinization temperature prior to phosphorylation, wherein the heat-treatment is carried out by shaking at 40° C. to 55° C. for 0.5 to 3 hours
    (c) adding sodium sulfate (Na2SO4) and a cross-linking agent to the starch obtained from process (b)
    (d) adding a base to the starch obtained from process (c) to adjust pH to 10 to 12, followed by cross-linking by phosphorylation;
    (e) adding an acid to the cross-linked product to perform neutralization;
    (f) heat-treating the starch sample obtained from process (d) at a temperature higher than the gelatinization temperature thereof for a short time to enhance emulsifying capacity wherein the heat-treatment is carried out by shaking at 80° C. to 95° C. for 1 to 30 minutes; and
    (g) washing the starch sample, followed by drying.

2. The method according to claim 1, wherein, in the process (c), a mixture of sodium trimetaphosphate and sodium tripolyphosphate is added as the cross-linking agent, in an amount of 10 to 12% by weight, based on the weight of the starch, and the sodium sulfate is added in an amount of 10% by weight, based on the weight of the starch.

3. The method according to claim 1, wherein, in the process (d), the phosphorylation is carried out by reacting at 40° C. to 55° C. for 1 to 6 hours.

4. The method according to claim 1, wherein, in the process (g), the starch sample is washed with water such that the content of phosphorous remaining in the resultant starch is adjusted to below 0.4% by weight.

5. The method according to claim 1, wherein the particle size of fibrous starch is 100 to 300 μm.

6. A low-fat mayonnaise comprising fibrous starch with enhanced emulsifying capacity prepared by the method according to claim 1.

7. A low-fat margarine comprising fibrous starch with enhanced emulsifying capacity prepared by the method according to claim 1.

* * * * *